United States Patent
Mori (10) Patent No.: US 11,027,630 B2
(45) Date of Patent: Jun. 8, 2021

(54) VEHICLE SEAT

(71) Applicant: Toyota Jidosha Kabushiki Kaisha, Toyota (JP)

(72) Inventor: Kazuya Mori, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/667,226

(22) Filed: Oct. 29, 2019

(65) Prior Publication Data
US 2020/0139863 A1    May 7, 2020

(30) Foreign Application Priority Data
Nov. 5, 2018   (JP) .............................. JP2018-208037

(51) Int. Cl.
| | |
|---|---|
| B60R 22/00 | (2006.01) |
| B60R 22/28 | (2006.01) |
| B60N 2/42 | (2006.01) |
| B60N 2/427 | (2006.01) |
| B60R 22/20 | (2006.01) |
| B60R 22/26 | (2006.01) |
| B60R 22/18 | (2006.01) |

(52) U.S. Cl.
CPC ....... *B60N 2/42763* (2013.01); *B60N 2/4221* (2013.01); *B60R 22/20* (2013.01); *B60R 22/26* (2013.01); *B60R 2022/1806* (2013.01)

(58) Field of Classification Search
CPC .. B60N 2/4221; B60N 2/42763; B60R 22/20; B60R 22/26; B60R 2022/1806
USPC .............................................. 297/216.1, 468
See application file for complete search history.

(56) References Cited

U.S. PATENT DOCUMENTS

| | | | | |
|---|---|---|---|---|
| 4,257,626 A | * | 3/1981 | Adomeit .............. | B60N 2/4221 297/216.2 |
| 5,340,185 A | * | 8/1994 | Vollmer ............... | B60N 2/4221 297/216.18 X |
| 6,050,635 A | * | 4/2000 | Pajon et al. ......... | B60N 2/4221 297/216.1 |
| 6,254,181 B1 | * | 7/2001 | Aufrere et al. ...... | B60N 2/4221 297/216.1 X |
| 6,386,631 B1 | * | 5/2002 | Masuda et al. ...... | B60N 2/4221 297/216.1 |
| 6,648,409 B1 | * | 11/2003 | Laporte ................ | B60N 2/4221 297/216.1 |

(Continued)

FOREIGN PATENT DOCUMENTS

| | | |
|---|---|---|
| JP | H02-021134 U | 2/1990 |
| JP | 2004-189097 A | 7/2004 |

*Primary Examiner* — Rodney B White
(74) *Attorney, Agent, or Firm* — Dinsmore & Shohl LLP (57) ABSTRACT

A vehicle seat includes a seat cushion, a pair of left and right side frames, a webbing including a lap webbing portion, and a buckle. The vehicle seat also includes a first link bracket that is connected to the webbing, and a second link bracket that is connected to the buckle and that is tilted toward one side together with the first link bracket by pulling on the lap webbing portion. The vehicle seat also includes a restriction bar that links the first link bracket and the second link bracket together in a seat width direction, that is moved toward a seat upper side by tilting of the first link bracket and the second link bracket toward the one side, and that restricts movement of an occupant seated on the seat cushion toward a seat front side.

11 Claims, 4 Drawing Sheets

(56) References Cited

U.S. PATENT DOCUMENTS

| | | | |
|---|---|---|---|
| 6,682,141 B2 * | 1/2004 | Reynolds et al. | B60N 2/42763 297/216.1 |
| 6,746,077 B2 * | 6/2004 | Klukowski | B60N 2/42763 297/216.1 |
| 6,755,465 B2 * | 6/2004 | Yamaguchi et al. | B60N 2/4221 297/216.1 |
| 6,837,540 B2 * | 1/2005 | Yamaguchi et al. | B60N 2/4221 297/216.1 |
| 6,921,133 B2 * | 7/2005 | Taoka et al. | B60N 2/2803 297/216.16 |
| 6,974,187 B2 * | 12/2005 | Minai | B60N 2/1615 297/216.1 |
| 7,300,108 B2 * | 11/2007 | Canteleux | B60N 2/1615 297/216.1 |
| 7,413,246 B2 * | 8/2008 | Saiguchi | B60N 2/4221 297/216.1 |
| 7,533,902 B2 * | 5/2009 | Arnold | B60R 22/1952 180/268 |
| 8,109,568 B2 * | 2/2012 | Masutani | B60N 2/4279 297/216.1 X |
| 8,113,575 B2 * | 2/2012 | Masutani | B60N 2/7094 297/216.1 |
| 8,528,986 B2 * | 9/2013 | Masutani | B60R 22/26 297/216.1 X |
| 8,573,691 B2 * | 11/2013 | Masutani | B60N 2/4221 297/216.1 X |
| 8,579,371 B2 * | 11/2013 | Masutani | B60N 2/42763 297/216.16 |
| 8,585,139 B2 * | 11/2013 | Masutani | B60N 2/42763 297/216.1 X |
| 8,678,510 B2 * | 3/2014 | Masutani | B60R 22/1955 297/216.1 X |
| 10,532,669 B2 * | 1/2020 | Kitagawa | B60N 2/165 |
| 10,793,032 B2 * | 10/2020 | Ando | B60N 2/4214 |
| 2003/0155801 A1 * | 8/2003 | Tatematsu et al. | B60R 22/1951 297/480 |
| 2014/0265503 A1 * | 9/2014 | Thomas | B60R 22/20 297/344.13 |
| 2020/0062149 A1 | 2/2020 | Sekizuka | |

* cited by examiner

VEHICLE SEAT

CROSS-REFERENCE TO RELATED APPLICATION

This application is based upon and claims the benefit of priority of the prior Japanese Patent Application No. 2018-208037, filed on Nov. 5, 2018, the entire content of which is incorporated herein by reference.

TECHNICAL FIELD

The present disclosure relates to a vehicle seat.

BACKGROUND ART

Japanese Patent Application Laid-Open (JP-A) No. 2004-189097 (Patent Document 1) below discloses a vehicle seat structure that suppresses the occurrence of a phenomenon (known as "submarining") in which an occupant restrained in a vehicle seat by a seatbelt device slides along a seat cushion toward the seat front side in a frontal collision of a vehicle. In the vehicle seat structure described in Patent Document 1, a pair of left and right supporting arms are provided on both seat width direction sides of a seat cushion frame, and a submarining restricting member spans between the pair of supporting arms. An actuator plate provided on one seat width direction side of the seat cushion frame is coupled to a buckle of a three-point seatbelt device through a cable wire. Moreover, the support arms pivot in coordination with pivoting of the actuator plate. In a frontal collision of the vehicle, when the occupant moves toward the seat front and the buckle is pulled toward the front, the actuator plate is moved to a lower side of a predetermined position by the pulling force of the cable wire, thereby pivoting the supporting arms to a predetermined position. The submarining restricting member is thus moved toward the seat upper side, thereby preventing or suppressing the occurrence of submarining.

However, although the configuration described in Patent Document 1 is an effective configuration from the perspective of preventing or suppressing the occurrence of submarining, there is room for improvement with respect to reducing the number of components configuring the mechanism to prevent or suppress the occurrence of submarining.

SUMMARY

In consideration of the above circumstances, an object of the present disclosure is to obtain a vehicle seat enabling a reduction in the number of components configuring a mechanism to prevent or suppress the occurrence of submarining.

A vehicle seat of a first aspect includes: a seat cushion configured to support the buttocks of an occupant; a pair of left and right side frames that each configure part of a framework of the seat cushion and that are disposed spaced apart from each other in a seat width direction; a webbing that includes a lap webbing portion configured to pass across the waist of the occupant seated on the seat cushion in the seat width direction; a buckle configured to engage with a tongue through which the webbing is inserted; a first link bracket that is supported by one of the side frames so as to be capable of tilting about an axial direction running in the seat width direction and that is connected to one side end portion of the webbing; a second link bracket that is supported by the other of the side frames so as to be capable of tilting about the same axis as the tilt axis of the first link bracket and that is connected to the opposite side of the buckle to the side with which the tongue engages, and that is tilted toward one side together with the first link bracket by the waist of the occupant pulling on the lap webbing portion during sudden vehicle deceleration; and a restriction member that links the first link bracket and the second link bracket together in the seat width direction, that is moved toward a seat upper side by tilting of the first link bracket and the second link bracket toward the one side, and that restricts movement of the occupant seated on the seat cushion toward a seat front side.

In the vehicle seat of the first aspect, the occupant seated on the seat cushion engages the tongue through which the webbing is inserted with the buckle. The webbing is thereby worn over the body of the occupant, and the lap webbing portion of the webbing passes across the waist of the occupant in the seat width direction. When the vehicle decelerates suddenly in a state in which the webbing is worn over the body of the occupant, the waist of the occupant pulls on the lap webbing portion of the webbing. The first link bracket and the second link bracket are thereby tilted toward the one side, and the restriction member is moved toward the seat upper side. Movement of the occupant seated on the seat cushion toward the seat front side is restricted as a result, enabling the occurrence of submarining to be prevented or suppressed. Note that in the vehicle seat of the first aspect, the first link bracket and the second link bracket are linked together by the restriction member, and the one side end portion of the webbing and the buckle are connected to the first link bracket and the second link bracket respectively. This simple configuration is capable of preventing or suppressing the occurrence of submarining.

A vehicle seat of a second aspect is the vehicle seat of the first aspect, wherein in seat side view, a distance from the tilt axis of the first link bracket to the restriction member and a distance from the tilt axis of the second link bracket to the restriction member are respectively set to a distance longer than a distance from the tilt axis of the first link bracket to a portion of the first link bracket connected to the webbing and to a distance longer than a distance from the tilt axis of the second link bracket to a portion of the second link bracket connected to the buckle.

In the vehicle seat of the second aspect, the respective distances are set as described above in seat side view, enabling a movement amount of the restriction member toward the seat upper side to be increased with respect to a pulling stroke of the lap webbing portion.

A vehicle seat of a third aspect is the vehicle seat of either the first aspect or the second aspect, further including a biasing member that biases the first link bracket and the second link bracket in a direction to tilt the first link bracket and the second link bracket toward another side.

In the vehicle seat of the third aspect, the first link bracket and the second link bracket are biased by the biasing member. Thus, after the vehicle has decelerated suddenly, the first link bracket and the second link bracket are easily tilted toward the other side. Accordingly, after the vehicle has decelerated suddenly, the restriction member can be moved swiftly toward the seat lower side (returned to its position prior to the sudden deceleration of the vehicle).

A vehicle seat of a fourth aspect is the vehicle seat of any one of the first aspect to the third aspect, wherein the pair of left and right side frames are each formed with an elongated hole-shaped opening through which part of the restriction member is inserted, and the restriction member is moved along a length direction of the openings.

In the vehicle seat of the fourth aspect, parts of the restriction member are inserted through the elongated hole-shaped openings formed in the pair of left and right side frames. The restriction member is moved along the length direction of the openings. This enables the movement trajectory of the restriction member to be stabilized.

A vehicle seat of a fifth aspect is the vehicle seat of any one of the first aspect to the fourth aspect, wherein at least one out of the first link bracket or the second link bracket is provided with a lap webbing portion pull-in device configured to pull in the lap webbing portion toward a seat lower side during sudden vehicle deceleration.

In the vehicle seat of the fifth aspect, the lap webbing portion is pulled in toward the seat lower side by the lap webbing portion pull-in device when the vehicle decelerates suddenly. The vehicle seat of the fifth aspect thereby enables the first link bracket and the second link bracket to be tilted toward the one side by the pulling-in force of the lap webbing portion pull-in device on the lap webbing portion, in addition to a force from the waist of the occupant pulling on the lap webbing portion of the webbing. This enables the restriction member to be moved toward the seat upper side more swiftly than in configurations in which the lap webbing portion pull-in device is not provided.

The vehicle seat according to the present disclosure exhibits an effect of enabling a reduction in the number of components configuring a mechanism to prevent or suppress the occurrence of submarining.

DETAILED DESCRIPTION

First Exemplary Embodiment

Figure 1:
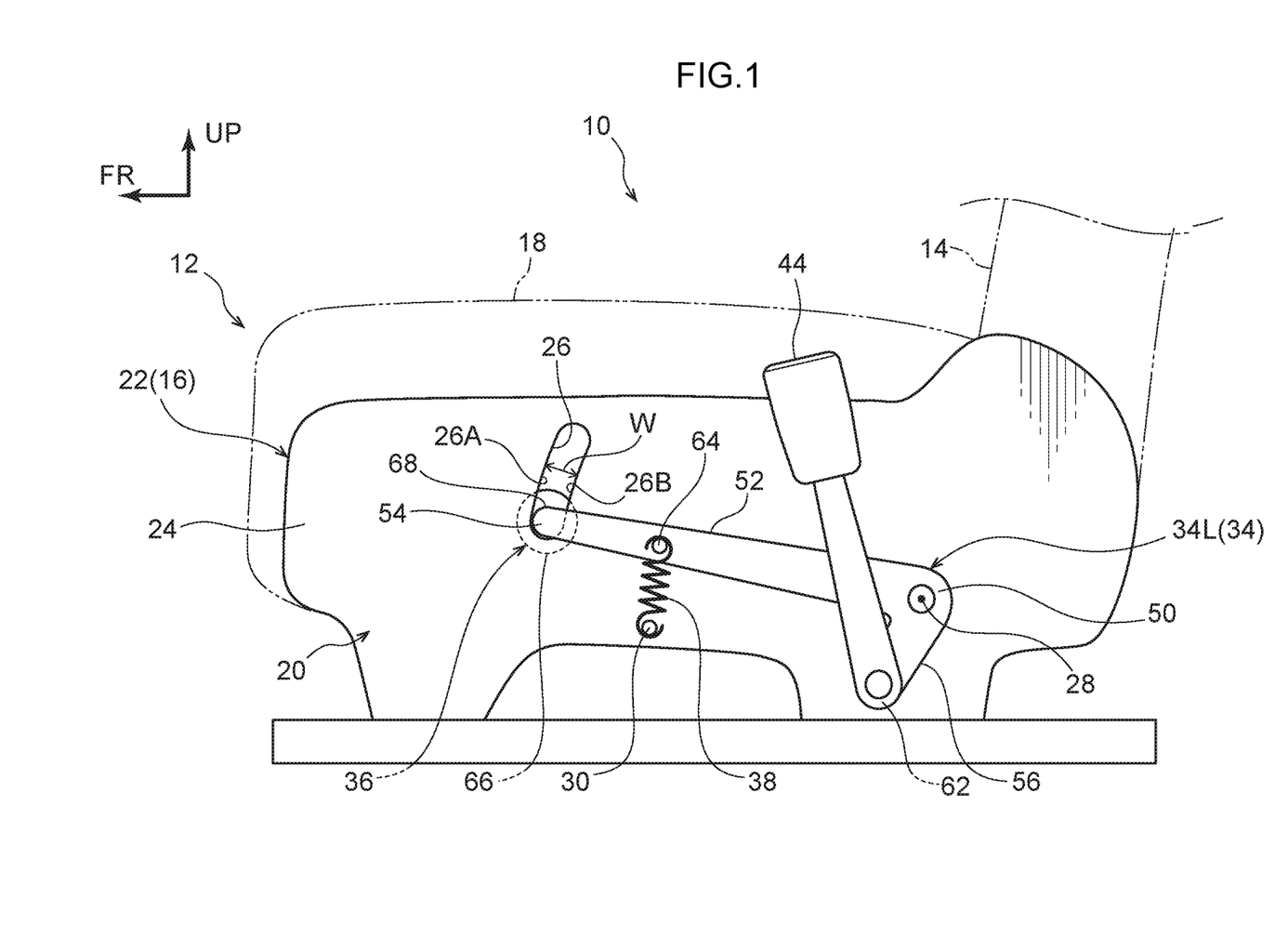
FIG. 1 is a side view illustrating a vehicle seat according to a first exemplary embodiment.
Figure 2:
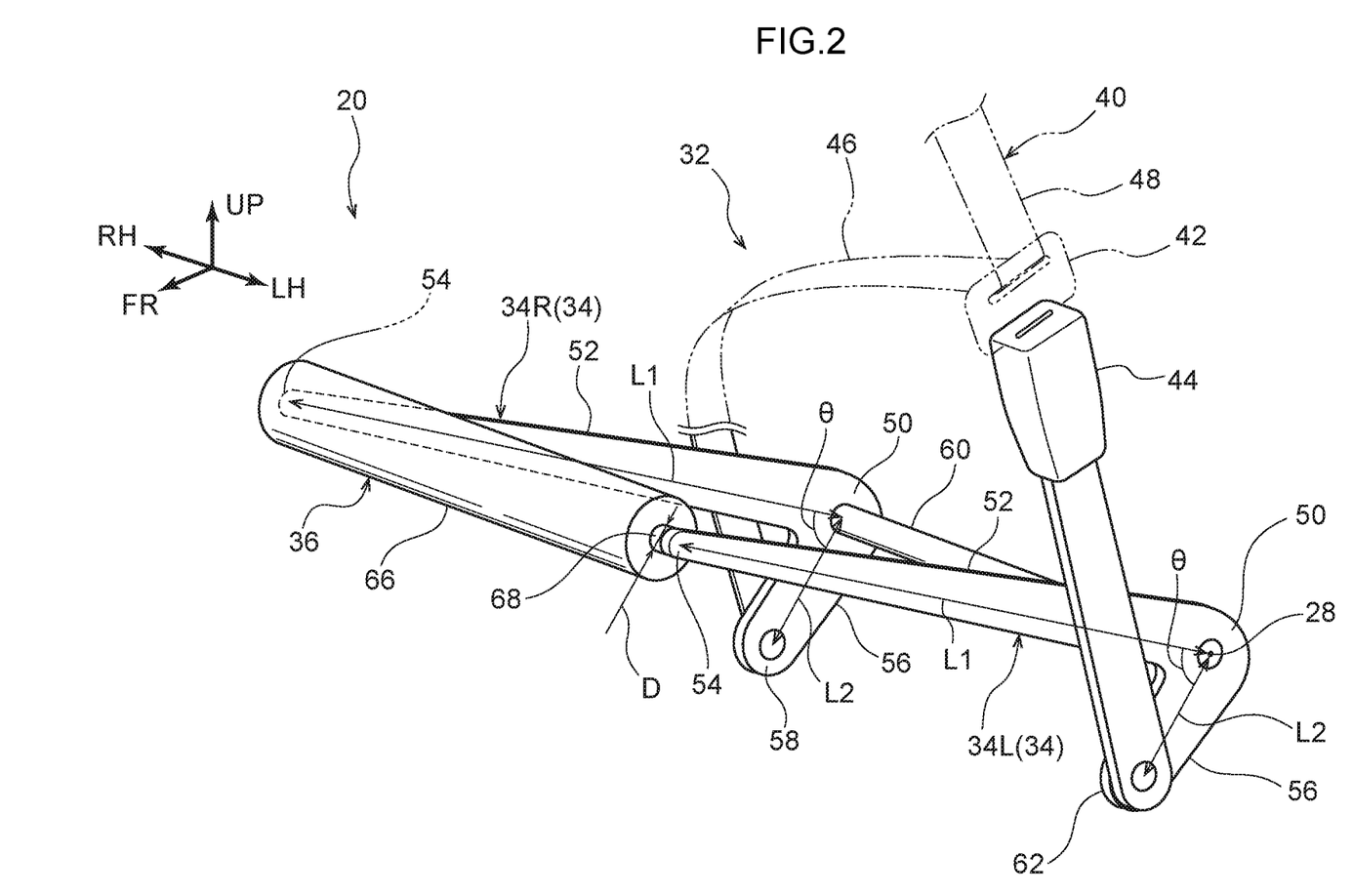
FIG. 2 is a perspective view illustrating a submarining suppression mechanism as viewed from a seat oblique front side.
Figure 3:
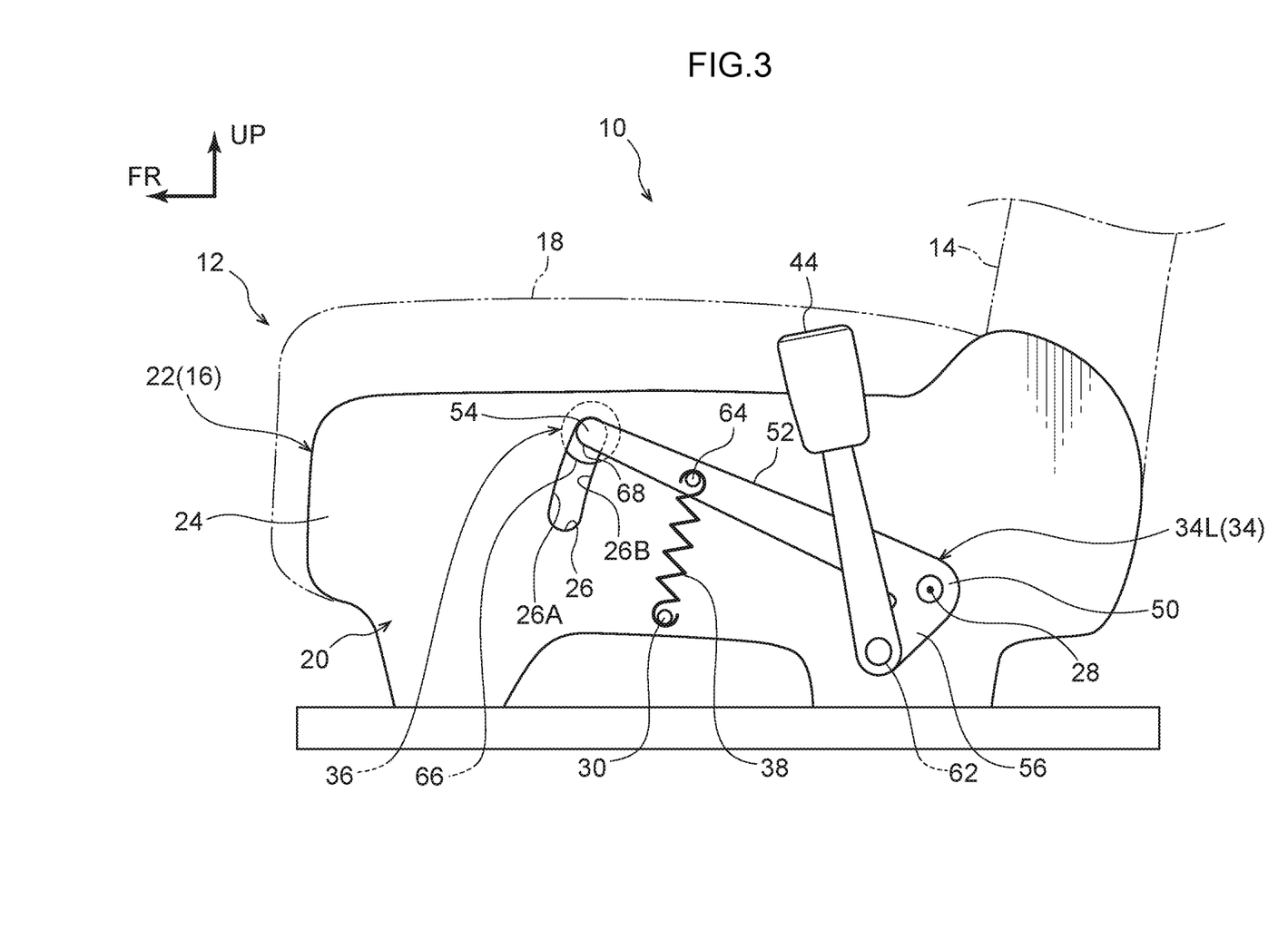
FIG. 3 is a side view corresponding to FIG. 1, illustrating a vehicle seat according to the first exemplary embodiment, in a state in which the vehicle has decelerated suddenly.

Explanation follows regarding a vehicle seat according to a first exemplary embodiment of the present disclosure, with reference to FIG. 1 to FIG. 3. Note that in the following explanation, reference to front, rear, left, right, upward, and downward directions refers to the front, rear, left, right, upward, and downward directions from the perspective of an occupant sitting in the vehicle seat. In the drawings, the arrow FR indicates a seat front direction, the arrow UP indicates a seat upward direction, the arrow RH indicates a seat right direction, and the arrow LH indicates a seat left direction, as appropriate. The left and right directions correspond to a seat width direction As illustrated in FIG. 1, a vehicle seat 10 of the present exemplary embodiment is provided in a vehicle cabin, and is fixed to a cabin floor in a state in which the seat front side faces toward the front side of the vehicle. Specifically, the vehicle seat 10 includes a seat cushion 12 that supports the buttocks of an occupant, and a seatback 14 that is attached to a rear end portion of the seat cushion 12 and supports the back of the occupant.

The seat cushion 12 includes a seat cushion frame 16 configuring a framework of the seat cushion 12, and a seat cushion pad 18 covered by a covering member and attached to the seat cushion frame 16. A submarining suppression mechanism 20 that suppresses the occurrence of a phenomenon (referred to as "submarining") in which the occupant seated in the vehicle seat 10 slides toward the front side along the seat cushion 12 during sudden vehicle deceleration is provided to the seat cushion 12 of the present exemplary embodiment.

The seat cushion frame 16 includes a pair of left and right side frames 22 disposed spaced apart from each other in the seat width direction. Note that FIG. 1 illustrates the side frame 22 on the left side. Since the side frame 22 on the left side and the side frame 22 on the right side are configured so as to be substantially symmetrical to each other in the seat width direction, the following explanation concerns the side frame 22 on the left side, and explanation regarding the side frame 22 on the right side is omitted.

Each of the side frames 22 is, for example, configured by pressing a sheet steel material. The side frame 22 includes a main section 24 extending along the vehicle vertical direction and the front-rear direction with a thickness direction along the seat width direction. The main section 24 is formed in a rectangular shape with its length direction along the front-rear direction in seat side view (as viewed from the left).

A link bracket 34 (a first link bracket 34R or a second link bracket 34L), described later, is attached to a rear side portion of the corresponding main section 24 so as to be capable of tilting about an axial direction running along the seat width direction. An elongated hole-shaped opening 26, through which part of a restriction bar 36 (described later) is inserted, is formed in a front side portion of the main section 24. A pair of edges 26A, 26B extending in a direction orthogonal to the length direction of the opening 26 are shaped so as to curve in a circular arc shape about a tilt center (a tilt axis 28) of the link brackets 34 (the first link bracket 34R and the second link bracket 34L). A width dimension W of the opening 26 (a spacing W between the pair of edges 26A, 26B) is a uniform spacing. A first spring anchor 30, to which one side end portion of a spring 38 (described later) is anchored, is provided at a lower side of a front-rear direction intermediate portion of the main section 24.

As illustrated in FIG. 2, the submarining suppression mechanism 20 includes a three-point seatbelt device 32 to restrain the body of an occupant seated in the vehicle seat 10 during sudden deceleration, such as in a frontal collision of the vehicle, the pair of left and right link brackets 34 (the first link bracket 34R and the second link bracket 34L) that tilt about the same axis as each other (the tilt axis 28), and the restriction bar 36, serving as a restriction member that links front end portions of the pair of left and right link brackets 34 together in the seat width direction. As illustrated in FIG. 1, the submarining suppression mechanism 20 further includes the spring 38, serving as a biasing member provided between the corresponding link bracket 34 and the side frame 22.

As illustrated in FIG. 2, the three-point seatbelt device 32 is configured including a webbing 40 formed in a belt shape, a tongue 42 through which the webbing 40 is inserted, a buckle 44 with which the tongue 42 engages, and a webbing take-up device, not illustrated in the drawings, that takes up the webbing 40. In the seatbelt device 32 of the present exemplary embodiment, the occupant seated in the vehicle seat 10 pulls out the webbing 40 from the webbing take-up device and engages the tongue 42 through which the webbing 40 is inserted with the buckle 44, such that the webbing 40 is worn over the body of the occupant seated in the vehicle seat 10. A portion of the webbing 40 that passes across the waist of the occupant in the seat width direction when worn by the occupant is referred to as a lap webbing portion 46. A portion of the webbing 40 that passes across the upper body of the occupant diagonally to the seat width direction when worn by the occupant is referred to as a shoulder webbing portion 48. In the present exemplary embodiment, the webbing take-up device is provided with a locking mechanism that limits pull-out of the webbing 40 from the webbing take-up device during sudden vehicle deceleration.

The pair of left and right link brackets 34 are formed with outer edges having substantially the same profile as each other in seat side view. The link bracket 34 disposed on the right side of the pair of left and right link brackets 34 is referred to as the first link bracket 34R, and the link bracket 34 disposed on the left side of the pair of left and right link brackets 34 is referred to as the second link bracket 34L.

The first link bracket 34R is formed in a plate shape with its thickness direction along the seat width direction, and is formed in a substantially L-shape (J-shape) in seat side view. The first link bracket 34R is disposed at the seat width direction outer side (right side) of the main section 24 of the side frame 22 (see FIG. 1) on the right side.

Specifically, the first link bracket 34R includes a supported portion 50 that is supported by (attached to) the rear side portion of the main section 24 of the side frame 22 on the right side so as to be capable of tilting about an axial direction running along the seat width direction. The first link bracket 34R further includes a first arm portion 52 that extends from the supported portion 50 toward the front side and becomes progressively narrower on progression toward the opposite side to the supported portion 50. An end portion of the first arm portion 52 on the opposite side to the supported portion 50 configures a restriction bar fixing portion 54 to which the restriction bar 36, described later, is fixed. The first link bracket 34R also includes a second arm portion 56 extending from the supported portion 50 so as to be inclined toward the front side on progression toward the lower side. An end portion of the second arm portion 56 on the opposite side to the supported portion 50 configures a webbing fixing portion 58 to which one side end portion of the webbing 40 is fixed. In the present exemplary embodiment, an angle θ formed between the extension direction of the first arm portion 52 from the supported portion 50 and the extension direction of the second arm portion 56 from the supported portion 50 is an acute angle. Moreover, in the present exemplary embodiment, in seat side view, a distance L1 from the supported portion 50 (tilt axis 28) to the restriction bar fixing portion 54 is set to a longer distance than a distance L2 from the supported portion 50 (tilt axis 28) to the webbing fixing portion 58.

As illustrated in FIG. 1 and FIG. 2, the second link bracket 34L is disposed at the seat width direction outer side (left side) of the main section 24 of the side frame 22 on the left side. The second link bracket 34L includes portions corresponding to the supported portion 50, the first arm portion 52, the restriction bar fixing portion 54, and the second arm portion 56 of the first link bracket 34R. Portions and dimensions of the second link bracket 34L corresponding to those of the first link bracket 34R are allocated the same reference numerals as the corresponding portions and dimensions of the first link bracket 34R. Moreover, in the present exemplary embodiment, the supported portion 50 of the second link bracket 34L and the supported portion 50 of the first link bracket 34R are linked together in the seat width direction through a connecting rod 60.

A portion of the second link bracket 34L corresponding to the webbing fixing portion 58 of the first link bracket 34R configures a buckle fixing portion 62 to which an end portion of the buckle 44 on the opposite side to the side that engages with the tongue 42 is fixed. As illustrated in FIG. 1, a length direction intermediate portion of the first arm portion 52 of the second link bracket 34L is provided with a second spring anchor 64 to which another side end portion of the spring 38 is anchored. The spring 38 is configured by a tension coil spring. In a state in which the spring 38 is anchored to the first spring anchor 30 of the side frame 22 and the second spring anchor 64 of the second link bracket 34L, the spring 38 is stretched from its natural length. The first link bracket 34R and the second link bracket 34L are thus biased in a direction to pivot (tilt) in a counterclockwise direction as viewed from the left side. Note that the spring 38 and the second spring anchor 64 are omitted from illustration in FIG. 2.

The restriction bar 36 is formed in a circular rod shape with its length direction along the seat width direction. The restriction bar 36 includes a large diameter portion 66 disposed between the main sections 24 of the pair of left and right side frames 22. A small diameter portion 68 configured with a smaller diameter than the large diameter portion 66 projects toward the left side from the center of a left side end of the large diameter portion 66. The small diameter portion 68 is inserted through the opening 26 formed in the main section 24 of the side frame 22 on the left side. An external diameter D of the small diameter portion 68 is set to a dimension slightly smaller than the width dimension W of the opening 26. A left side end of the small diameter portion 68 is fixed to the restriction bar fixing portion 54 of the second link bracket 34L.

Although not illustrated in the drawings, a small diameter portion 68 configured with a smaller diameter than the large diameter portion 66 also projects toward the right side from the center of a right side end of the large diameter portion 66. The small diameter portion 68 is inserted through the opening 26 formed in the main section 24 of the side frame 22 on the right side. A right side end of the small diameter portion 68 is fixed to the restriction bar fixing portion 54 of the first link bracket 34R.

Operation and Effects of Present Exemplary Embodiment

Explanation follows regarding operation and effects of the present exemplary embodiment.

As illustrated in FIG. 1 and FIG. 2, an occupant seated in the vehicle seat 10 of the present exemplary embodiment described above engages the tongue 42 through which the webbing 40 is inserted with the buckle 44, such that the webbing 40 is worn over the body of the occupant. Namely, the lap webbing portion 46 of the webbing 40 passes across the waist of the occupant in the seat width direction, and the shoulder webbing portion 48 passes across the upper body of the occupant diagonally to the seat width direction.

If the vehicle decelerates suddenly, for example in a frontal collision of the vehicle, in a state in which the webbing 40 is worn over the body of the occupant, pull-out of the webbing 40 from the webbing take-up device is limited. The body of the occupant attempting to move toward the front side under inertia is thus restrained by the webbing 40.

Even in a state in which the body of the occupant has been restrained by the webbing 40, the occupant still attempts to move toward the front side under inertia. In particular, if the buttocks of the occupant attempt to move so as to slide toward the front side over the seat cushion 12, the waist of the occupant pulls on the lap webbing portion 46 of the webbing 40. Thus, as illustrated in FIG. 3, the first link bracket 34R and the second link bracket 34L pivot (tilt) in a clockwise direction as viewed from the left side, such that the restriction bar 36 moves toward the seat upper side. As a result, movement of the buttocks of the occupant seated on the seat cushion 12 toward the front side is restricted through the seat cushion pad 18 and the restriction bar 36, enabling the occurrence of submarining to be prevented or suppressed.

In the vehicle seat 10 of the present exemplary embodiment, the first link bracket 34R and the second link bracket 34L are linked together by the restriction bar 36, and the one side end portion of the webbing 40 and the buckle 44 are connected to the first link bracket 34R and the second link bracket 34L respectively. This simple configuration is capable of preventing or suppressing the occurrence of submarining. Namely, the occurrence of submarining can be prevented or suppressed by the submarining suppression mechanism 20 that has few configuration components. Configuring the vehicle seat 10 using the submarining suppression mechanism 20 configured in this manner enables both an increase in costs and an increase in the weight of the vehicle seat 10 to be suppressed.

In the present exemplary embodiment, the spring 38 biases the first link bracket 34R and the second link bracket 34L in a direction so as to pivot (tilt) in a counterclockwise direction as viewed from the left side. Accordingly, after the vehicle has decelerated suddenly, the restriction bar 36 fixed to the first link bracket 34R and the second link bracket 34L can be moved swiftly toward the lower side (returned to its position prior to the sudden deceleration of the vehicle) by biasing force from the spring 38, in addition to load from the occupant input to the restriction bar 36 through the seat cushion pad 18.

In the vehicle seat 10 of the present exemplary embodiment, the distance L1 from the supported portion 50 of the first link bracket 34R to the restriction bar fixing portion 54 is set to a longer distance than the distance L2 from the supported portion 50 to the webbing fixing portion 58 in seat side view. Moreover, the distance L1 from the supported portion 50 of the second link bracket 34L to the restriction bar fixing portion 54 is set to a longer distance than the distance L2 from the supported portion 50 to the buckle fixing portion 62 in seat side view. This enables a movement amount of the restriction bar 36 toward the seat upper side to be increased with respect to a pulling stroke of the lap webbing portion 46.

Moreover, in the present exemplary embodiment, the small diameter portions 68 of the restriction bar 36 are inserted through the elongated hole-shaped openings 26 formed in the main sections 24 of the pair of left and right side frames 22. This enables wobbling and twisting of the restriction bar 36 as it moves to be suppressed, enabling the movement trajectory of the restriction bar 36 to be stabilized.

Second Exemplary Embodiment

Figure 4:
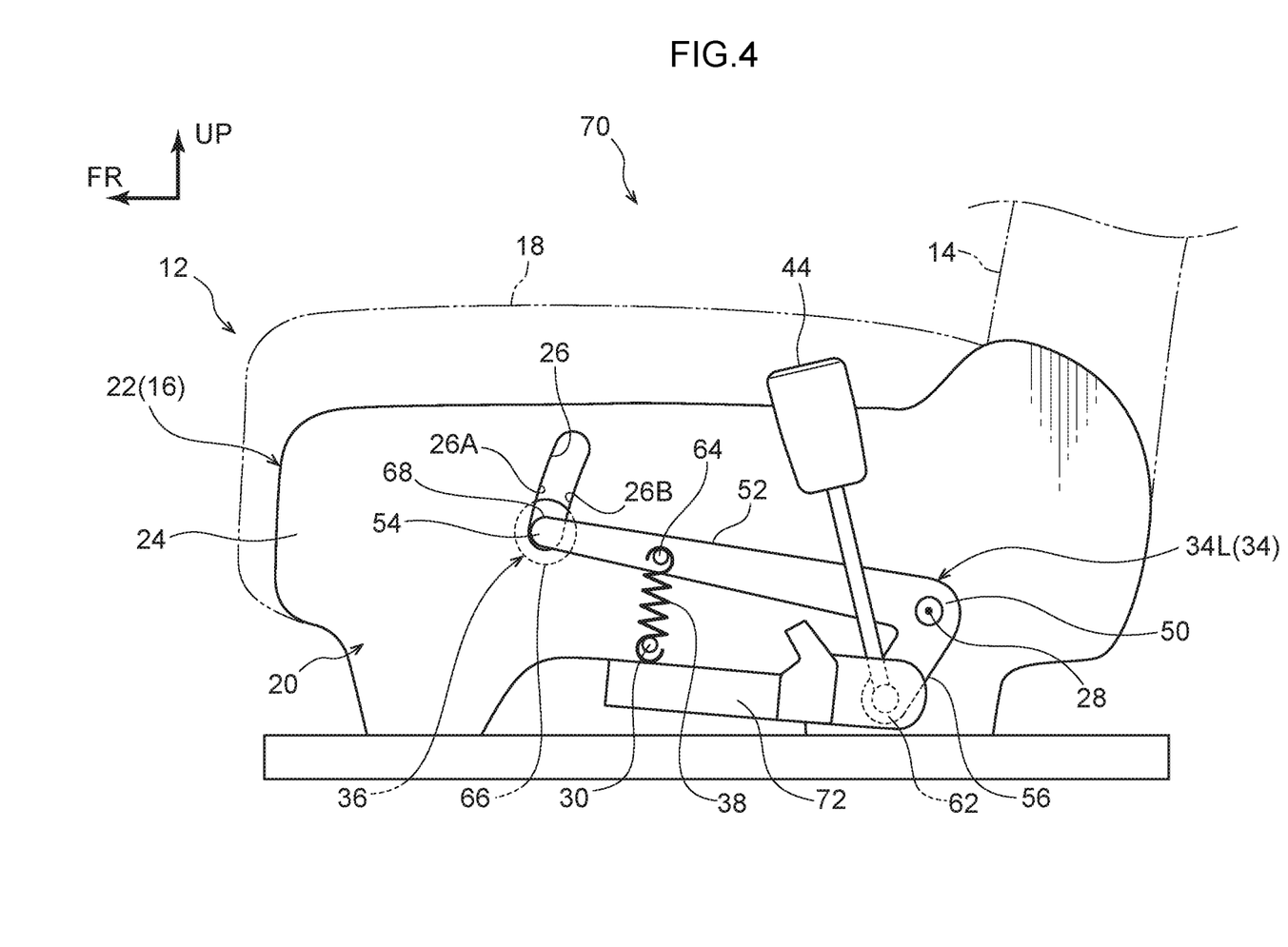
FIG. 4 is a side view corresponding to FIG. 1, illustrating a vehicle seat according to a second exemplary embodiment.

Explanation follows regarding a vehicle seat 70 according to a second exemplary embodiment of the present disclosure, with reference to FIG. 4. Note that members and portions of the vehicle seat 70 according to the second exemplary embodiment that correspond to those of the vehicle seat 10 according to the first exemplary embodiment described above are allocated the same reference numerals as the corresponding members and portions of the vehicle seat 10 according to the first exemplary embodiment, and explanation thereof may be omitted.

As illustrated in FIG. 4, in the vehicle seat 70 of the present exemplary embodiment, a buckle pre-tensioner 72, serving as a lap webbing portion pull-in device that moves the buckle 44 toward the seat lower side during sudden vehicle deceleration is provided (fixed) to the buckle fixing portion 62 of the second link bracket 34L.

In the vehicle seat 70 of the present exemplary embodiment, the buckle pre-tensioner 72 actuates during sudden vehicle deceleration, such that the buckle 44 is moved toward the seat lower side (the side of the buckle fixing portion 62 of the second link bracket 34L). The lap webbing portion 46 of the webbing 40 is thus pulled in toward the seat lower side. This thereby enables the first link bracket 34R and the second link bracket 34L to be pivoted (tilted) in a clockwise direction as viewed from the left side by the pulling-in force on the lap webbing portion 46 due to actuation of the buckle pre-tensioner 72, in addition to a force from the waist of the occupant pulling on the lap webbing portion 46 of the webbing 40. This enables the restriction bar 36 to be moved toward the upper side more swiftly than in configurations in which the buckle pre-tensioner 72 is not provided.

Note that instead of the buckle pre-tensioner 72, a lap webbing portion pull-in device that pulls in the lap webbing portion 46 toward the seat lower side by taking up the one side end portion (the end portion on the opposite side to the webbing take-up device) of the webbing 40 during sudden vehicle deceleration may be provided to the webbing fixing portion 58 of the first link bracket 34R. Alternatively, this lap webbing portion pull-in device and the buckle pre-tensioner 72 described above may both be provided.

Although explanation has been given regarding exemplary embodiments of the present disclosure, the present disclosure is not limited thereto, and obviously various other modifications may be implemented within a range not departing from the spirit of the present disclosure.

What is claimed is:

1. A vehicle seat comprising:
    a seat cushion configured to support the buttocks of an occupant;
    a pair of left and right side frames that each configure part of a framework of the seat cushion and that are spaced apart from each other in a seat width direction;
    a webbing that includes a lap webbing portion configured to pass across the waist of the occupant seated on the seat cushion, in the seat width direction;
    a buckle configured to engage with a tongue through which the webbing is inserted;
    a first link bracket that is supported by one of the side frames so as to be tiltable about an axial direction running in the seat width direction and that is connected to one side end portion of the webbing;
    a second link bracket that is supported by the other of the side frames so as to be tiltable about the same axis as the tilt axis of the first link bracket and that is connected to an opposite side of the buckle to the side with which the tongue engages, and that is tilted toward a seat upper side together with the first link bracket by the waist of the occupant pulling on the lap webbing portion during sudden vehicle deceleration; and a restriction member that links the first link bracket and the second link bracket together in the seat width direction, that is moved toward the seat upper side by tilting of the first link bracket and the second link bracket toward the seat upper side, and that restricts movement of the occupant seated on the seat cushion toward a seat front side.

2. The vehicle seat of claim 1, wherein, in seat side view, a distance from the tilt axis of the first link bracket to the restriction member and a distance from the tilt axis of the second link bracket to the restriction member are, respectively, longer than a distance from the tilt axis of the first link bracket to a portion of the first link bracket connected to the webbing and longer than a distance from the tilt axis of the second link bracket to a portion of the second link bracket connected to the buckle.

3. The vehicle seat of claim 2, further comprising a biasing member that biases the first link bracket and the second link bracket in a direction to tilt the first link bracket and the second link bracket toward a seat lower side.

4. The vehicle seat of claim 2, wherein:
the pair of left and right side frames are each formed with an elongated hole-shaped opening through which part of the restriction member is inserted; and
the restriction member is moved along a length direction of the openings.

5. The vehicle seat of claim 2, wherein at least one of the first link bracket or the second link bracket is provided with a lap webbing portion pull-in device configured to pull in the lap webbing portion toward the seat lower side during sudden vehicle deceleration.

6. The vehicle seat of claim 1, further comprising a biasing member that biases the first link bracket and the second link bracket in a direction to tilt the first link bracket and the second link bracket toward a seat lower side.

7. The vehicle seat of claim 6, wherein:
the pair of left and right side frames are each formed with an elongated hole-shaped opening through which part of the restriction member is inserted; and
the restriction member is moved along a length direction of the openings.

8. The vehicle seat of claim 6, wherein at least one of the first link bracket or the second link bracket is provided with a lap webbing portion pull-in device configured to pull in the lap webbing portion toward the seat lower side during sudden vehicle deceleration.

9. The vehicle seat of claim 1, wherein:
the pair of left and right side frames are each formed with an elongated hole-shaped opening through which part of the restriction member is inserted; and
the restriction member is moved along a length direction of the openings.

10. The vehicle seat of claim 9, wherein at least one of the first link bracket or the second link bracket is provided with a lap webbing portion pull-in device configured to pull in the lap webbing portion toward the seat lower side during sudden vehicle deceleration.

11. The vehicle seat of claim 1, wherein at least one of the first link bracket or the second link bracket is provided with a lap webbing portion pull-in device configured to pull in the lap webbing portion toward the seat lower side during sudden vehicle deceleration.

* * * * *